(12) United States Patent
Dülgar

(10) Patent No.: US 12,246,720 B2
(45) Date of Patent: Mar. 11, 2025

(54) METHOD FOR SUPPORTING A VEHICLE

(71) Applicant: MERCEDES-BENZ GROUP AG, Stuttgart (DE)

(72) Inventor: Yildirim Dülgar, Sindelfingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 196 days.

(21) Appl. No.: 17/924,406

(22) PCT Filed: Mar. 26, 2021

(86) PCT No.: PCT/EP2021/057972
§ 371 (c)(1),
(2) Date: Nov. 10, 2022

(87) PCT Pub. No.: WO2021/233599
PCT Pub. Date: Nov. 25, 2021

(65) Prior Publication Data
US 2023/0271613 A1    Aug. 31, 2023

(30) Foreign Application Priority Data
May 19, 2020    (DE) ...................... 10 2020 002 993.0

(51) Int. Cl.
*B60W 30/18*    (2012.01)
*B60W 30/14*    (2006.01)
(Continued)

(52) U.S. Cl.
CPC .... *B60W 30/18163* (2013.01); *B60W 30/143* (2013.01); *B60W 60/001* (2020.02); *G08G 1/22* (2013.01); *B60W 2556/65* (2020.02)

(58) Field of Classification Search
CPC ......... B60W 30/18163; B60W 30/143; B60W 60/001; B60W 2556/65; B60W 60/00276;
(Continued)

(56) References Cited

U.S. PATENT DOCUMENTS 3,796,871 A * 3/1974 Helmcke ................ G08G 1/075
246/167 R
9,862,272 B2   1/2018 Schuberth et al.
(Continued)

FOREIGN PATENT DOCUMENTS

CN    103702883 A    4/2014
CN    107437334 A * 12/2017 ............ B60W 30/12
(Continued)

OTHER PUBLICATIONS

CN-107437334-A English machine translation (Year: 2017).*
(Continued)

*Primary Examiner* — Angelina M Shudy
(74) *Attorney, Agent, or Firm* — PATENT PORTFOLIO BUILDERS PLLC

(57) ABSTRACT

A method for supporting a vehicle, driving in the automated driving mode, in a merging maneuver from an acceleration lane into a traffic lane of a multi-lane roadway section is provided. The vehicle is connected to a central computer unit via a radio link. The merging maneuver intended by the vehicle is transmitted to the central computer unit via the radio link. Information about the intended merging maneuver of the vehicle is transmitted from the central computer unit to at least two further vehicles located on the roadway section in an environment of the vehicle. Consequently, a merging gap is prepared for the vehicle in the traffic lane by means of one of the two further vehicles. A lane change of road users from an overtaking lane into the merging gap in the traffic lane is prevented by another of the two further vehicles.

6 Claims, 2 Drawing Sheets

Figure 1:
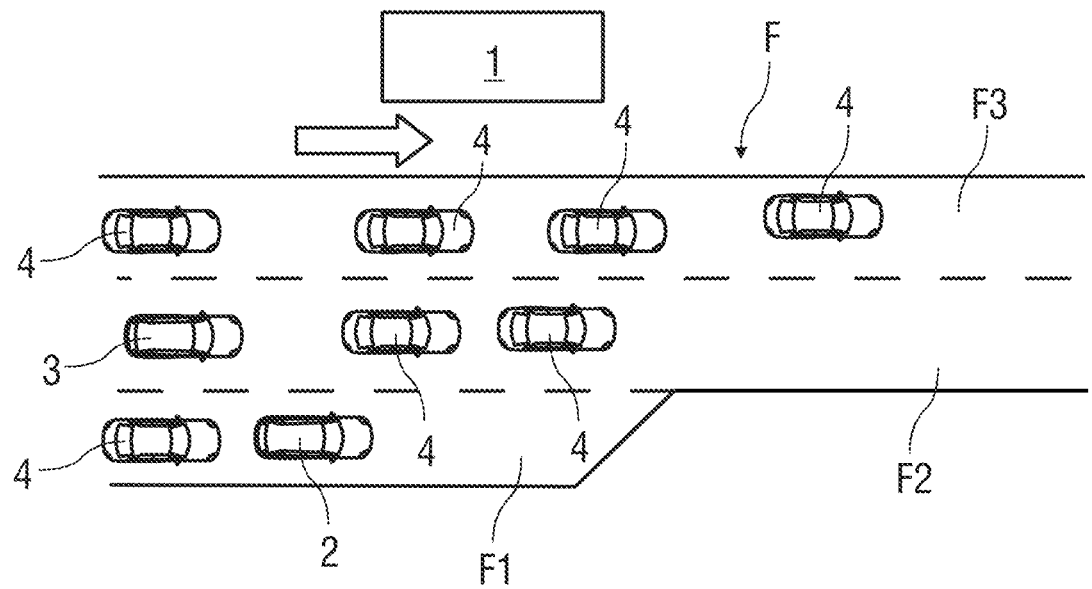

(51) Int. Cl.
*B60W 60/00* (2020.01)
*G08G 1/00* (2006.01)

(58) Field of Classification Search
CPC .......... B60W 2556/45; B60W 2556/40; G08G 1/22; G08G 1/166; G08G 1/167; G08G 1/164; G05D 1/00; H04W 4/44; G06V 10/803; G06V 10/60; G01C 21/16
See application file for complete search history.

(56) References Cited

U.S. PATENT DOCUMENTS

| | | | |
|---|---|---|---|
| 9,928,746 | B1 | 3/2018 | MacNeille et al. |
| 10,089,876 | B1* | 10/2018 | Ramasamy ............ G05D 1/028 |
| 10,115,314 | B2* | 10/2018 | Boegel ................. G05D 1/0293 |
| 10,252,721 | B1* | 4/2019 | Bai ......................... B60Q 1/508 |
| 10,304,333 | B2 | 5/2019 | Engel et al. |
| 10,567,923 | B2* | 2/2020 | Gade ......................... H04W 4/40 |
| 10,733,887 | B2 | 8/2020 | Kleen et al. |
| 10,902,725 | B2* | 1/2021 | Tanaka .................. B60W 40/04 |
| 11,161,503 | B2 | 11/2021 | Saigusa et al. |
| 11,685,379 | B2* | 6/2023 | Matsumura ..... B60W 30/18163 701/23 |
| 11,702,079 | B2* | 7/2023 | Yasui .............. B60W 30/18163 701/96 |
| 11,801,838 | B2* | 10/2023 | Yu .......................... B60W 10/18 |
| 12,080,169 | B2* | 9/2024 | Dülgar ................. G08G 1/0129 |
| 12,122,383 | B2* | 10/2024 | Qian ...................... B60W 30/16 |
| 2014/0100734 | A1* | 4/2014 | Yamashiro ............... G08G 1/22 701/23 |
| 2014/0107867 | A1* | 4/2014 | Yamashiro ............ B60W 10/18 701/2 |
| 2014/0316865 | A1* | 10/2014 | Okamoto ............. G05D 1/0293 705/14.1 |
| 2017/0011633 | A1* | 1/2017 | Boegel ............ B60W 30/18163 |
| 2017/0076607 | A1* | 3/2017 | Linder ............. B60W 30/0956 |
| 2018/0046193 | A1* | 2/2018 | Takada ................. G05D 1/0276 |
| 2018/0082619 | A1* | 3/2018 | MacNeille ............... G08G 1/22 |
| 2018/0099676 | A1* | 4/2018 | Goto ..................... B60W 30/10 |
| 2018/0253976 | A1* | 9/2018 | Inam ........................ G08G 1/22 |
| 2018/0339708 | A1* | 11/2018 | Geller .................. B60L 3/0015 |
| 2019/0014446 | A1* | 1/2019 | Gade .................... G08G 1/0133 |
| 2019/0051159 | A1* | 2/2019 | Wang ................... G05D 1/0027 |
| 2019/0073910 | A1* | 3/2019 | Boegel ................... G08G 1/167 |
| 2019/0098471 | A1* | 3/2019 | Rech ........................ G08G 1/22 |
| 2019/0126927 | A1* | 5/2019 | Uejima ................ G05D 1/0212 |
| 2019/0139415 | A1* | 5/2019 | Sakaguchi ............ B60W 30/10 |
| 2019/0193738 | A1* | 6/2019 | Oh ....................... G05D 1/0251 |
| 2019/0311627 | A1* | 10/2019 | Wendt .................. G05D 1/0289 |
| 2019/0378415 | A1* | 12/2019 | Shinohara .............. G08G 1/166 |
| 2020/0098266 | A1 | 3/2020 | Tanaka |
| 2020/0207371 | A1* | 7/2020 | Dougherty ........... G06V 20/584 |
| 2020/0286386 | A1* | 9/2020 | Zhou ................ G08G 1/096775 |
| 2020/0307600 | A1* | 10/2020 | Sato ....................... G08G 1/167 |
| 2020/0327812 | A1* | 10/2020 | Ran .................. G08G 1/096783 |
| 2020/0401160 | A1* | 12/2020 | Lacaze .................. B60W 30/16 |
| 2021/0084460 | A1* | 3/2021 | Yang ....................... H04W 4/40 |
| 2021/0295703 | A1* | 9/2021 | Jalali ................ G08G 1/096741 |
| 2021/0382492 | A1* | 12/2021 | Park ........................ B60L 58/13 |
| 2022/0185290 | A1* | 6/2022 | Sanfridson ............. G08G 1/167 |
| 2022/0253074 | A1* | 8/2022 | Williams ............. G01C 21/005 |
| 2022/0254256 | A1* | 8/2022 | Dülgar ................... G08G 1/167 |
| 2022/0262253 | A1* | 8/2022 | Wu ......................... G08G 1/167 |
| 2022/0289201 | A1* | 9/2022 | Nordbruch ........... B60W 40/04 |
| 2022/0292982 | A1* | 9/2022 | Brandin ................. G08G 1/167 |
| 2022/0292985 | A1* | 9/2022 | Brandin ............... G05D 1/0293 |
| 2022/0297695 | A1* | 9/2022 | Mahajan ......... B60W 60/00276 |
| 2022/0327930 | A1* | 10/2022 | Sivakumar ............. G08G 1/164 |
| 2022/0371595 | A1* | 11/2022 | Meuresch .............. G08G 1/167 |
| 2023/0041319 | A1* | 2/2023 | You .................. G08G 1/096791 |
| 2023/0053459 | A1* | 2/2023 | You .................. B60W 30/0956 |
| 2024/0083460 | A1* | 3/2024 | Yeom ............. B60W 30/18163 |

FOREIGN PATENT DOCUMENTS

| | | | | |
|---|---|---|---|---|
| CN | 107564317 | A | | 1/2018 |
| DE | 102012011994 | A1 | | 12/2013 |
| DE | 102014000843 | A1 | | 8/2014 |
| DE | 102014009625 | A1 | | 11/2014 |
| DE | 102014215980 | A1 | | 2/2016 |
| DE | 102016009118 | A1 | | 2/2017 |
| DE | 102016205141 | A1 | | 5/2017 |
| DE | 102016205972 | A1 | * | 11/2017 ............ B60W 30/12 |
| DE | 102016207791 | A1 | | 11/2017 |
| DE | 102017210252 | A1 | | 12/2017 |
| DE | 102017121525 | A1 | | 3/2018 |
| DE | 102018009651 | A1 | * | 7/2019 |
| DE | 102018002675 | A1 | | 10/2019 |
| DE | 102018208910 | A1 | | 12/2019 |
| GB | 2572210 | A | * | 9/2019 ........... G05D 1/0293 |
| JP | H10105893 | A | | 4/1998 |
| JP | 2014078170 | A | | 5/2014 |
| WO | 2007032335 | A1 | | 3/2007 |

OTHER PUBLICATIONS

DE-102018009651-A1 English translation description (Year: 2018).*
DE-102018009651-A1 English translation abstract (Year: 2018).*
DE-102016205972-A1 machine translation (Year: 2016).*
International Search Report and Written Opinion mailed Jul. 15, 2021 in related/corresponding International Application No. PCT/EP2021/057972.
Office Action created Nov. 27, 2020 in related/corresponding DE Application No. 10 2020 002 993.0.
Notice of Reason for Refusal dated Nov. 14, 2023 in related/corresponding JP Application No. 2022-570403.
Office Action dated Sep. 24, 2024 in related/corresponding CN Application No. 202180036375.1.

* cited by examiner

METHOD FOR SUPPORTING A VEHICLE

BACKGROUND AND SUMMARY OF THE INVENTION

Exemplary embodiments of the invention relate to a method for supporting a vehicle, driving in the automated driving mode, during a merging maneuver from an acceleration lane into a traffic lane of a multi-lane roadway section, wherein the vehicle is connected to a central computer unit via a radio link.

DE 10 2014 009 625 A1 disclose a method for the operation of a motor vehicle in which, in an operating mode, the vehicle regulates, via automatic speed regulation, a normal distance to a vehicle driving ahead on a road, wherein the distance is automatically enlarged to an enlarged distance on slip roads to and/or exits from the road.

Furthermore, DE 10 2016 009 118 A1 describes a method for vehicle communication. The method provides that, on at least one section of road, data is wirelessly transferred between a lead vehicle driving ahead, or an external server connected to the lead vehicle, and at least one following vehicle following the lead vehicle when the at least one following vehicle is located within a given distance range to the lead vehicle. A guidance signal is transmitted from the lead vehicle or from the external server to the at least one following vehicle, wherein at least one function of a driver assistance device integrated in the at least one following vehicle is guided by means of the guidance signal.

Exemplary embodiments of the invention are directed to a method for supporting a vehicle driving in the automated driving mode.

A method for supporting a vehicle, driving in the automated driving mode, in a merging maneuver from an acceleration lane to a traffic lane of a multi-lane roadway section, wherein the vehicle is connected to a central computer unit via a radio link, provides, according to the invention, that the merging maneuver intended by the vehicle is transmitted to the central computer unit via the radio link, and information relating to the intended merging maneuver of the vehicle is transmitted from the central computer unit to at least two further vehicles located in an environment of the vehicle on the roadway section. Consequently, a merging gap is provided for the vehicle in the traffic lane by means of one of the two further vehicles, and vehicles are prevented from moving from an overtaking lane into the merging gap in the traffic lane by means of another of the two further vehicles.

By implementing the method, the automated vehicle is supported in merging into the traffic lane, whereby a duration for the merging maneuver can be optimized, in particular shortened. By means of the method, the merging maneuver can be facilitated for the automated vehicle by cooperation with the further vehicles.

In an embodiment of the method, the two further vehicles are also vehicles driving in the automated driving mode, which are connected to the central computer unit via a radio link. A driving command is therefore issued to the two further vehicles by means of the computer unit to provide the merging gap, with which the two further vehicles comply. If the two further vehicles are manually operated, the risk arises that the merging gap is not formed, and so the vehicle has to wait to identify a suitable merging gap itself to carry out the merging maneuver.

By means of the two further vehicles, in a further embodiment, a confirmation of a receipt of the intended merging maneuver is sent to the vehicle via the central computer unit, such that the vehicle is informed of it, and a suitable time gap for carrying out the merging maneuver is recorded, and the merging maneuver can be carried out from the acceleration lane to the traffic lane.

An embodiment of the method provides that the further vehicle reduces its current speed to form the merging gap, whereby it is made possible for the vehicle to merge into the traffic lane in front of the further vehicle. As the further vehicle does not form the merging gap by increasing its driving speed, such that the vehicle moves into the traffic lane after the further vehicle, it can largely be avoided that a vehicle following the further vehicle closes up relatively close, such that the time gap for the merging maneuver of the vehicle is too small, and a waiting process of the vehicle is thereby lengthened.

The further vehicle, in a further possible embodiment for the formation of the merging gap, carries out a lane change from the overtaking lane to the traffic lane, such that the vehicle can initialize its merging maneuver into the traffic lane. Here, by means of the lane change of the further vehicle, it is substantially avoided that a road user uses a space themselves that was originally available in the traffic lane, and so the vehicle cannot merge into the traffic lane.

In particular, in a possible development, the formation of the merging gap takes place while taking into account further road users in an environment of the further vehicles, such that substantially no danger for the vehicle, the further vehicles, and the further road users arises at any point in time of the formation of the merging gap. By means of the two further vehicles, a cooperative merging into the traffic lane is enabled for the vehicle, wherein a safety aspect is taken into account for all involved on the roadway section.

Furthermore, in a further possible embodiment, the method provides that the information about the intended merging maneuver of the vehicle is transmitted by means of the central computer unit to further vehicles, which are classified by the central computer unit as suitable for forming the merging gap as a result of their current position.

It is therefore determined which further vehicles are located in a suitable position relative to the acceleration lane and to the vehicle to form a merging gap provided for the vehicle, into which the vehicle merges without hindering and/or endangering further road users.

BRIEF DESCRIPTION OF THE DRAWING FIGURES

Exemplary embodiments of the invention are illustrated in more detail in the following by means of drawings.

Figure 2:
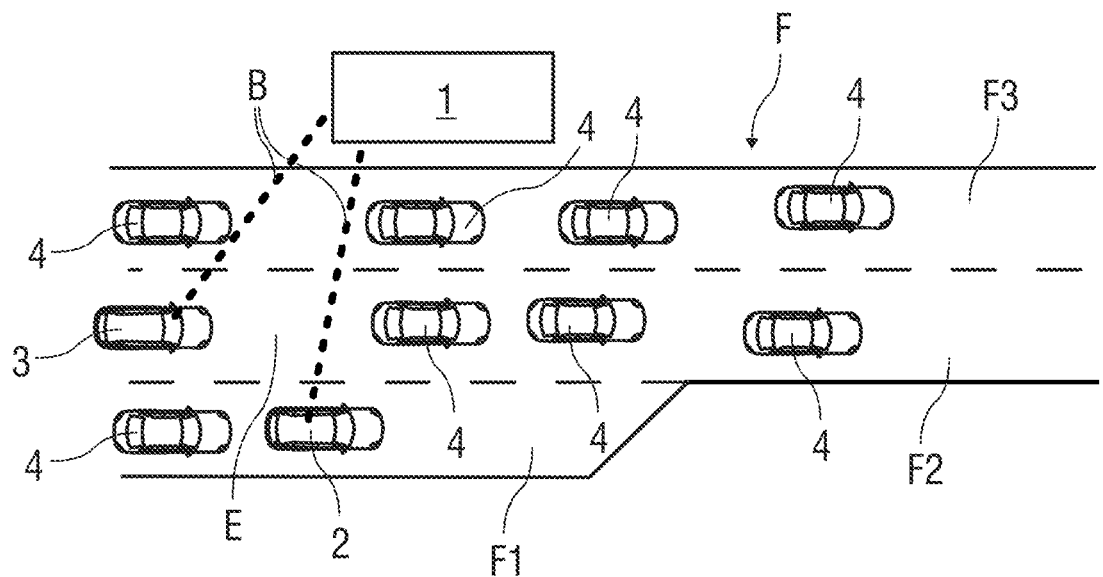
Figure 3:
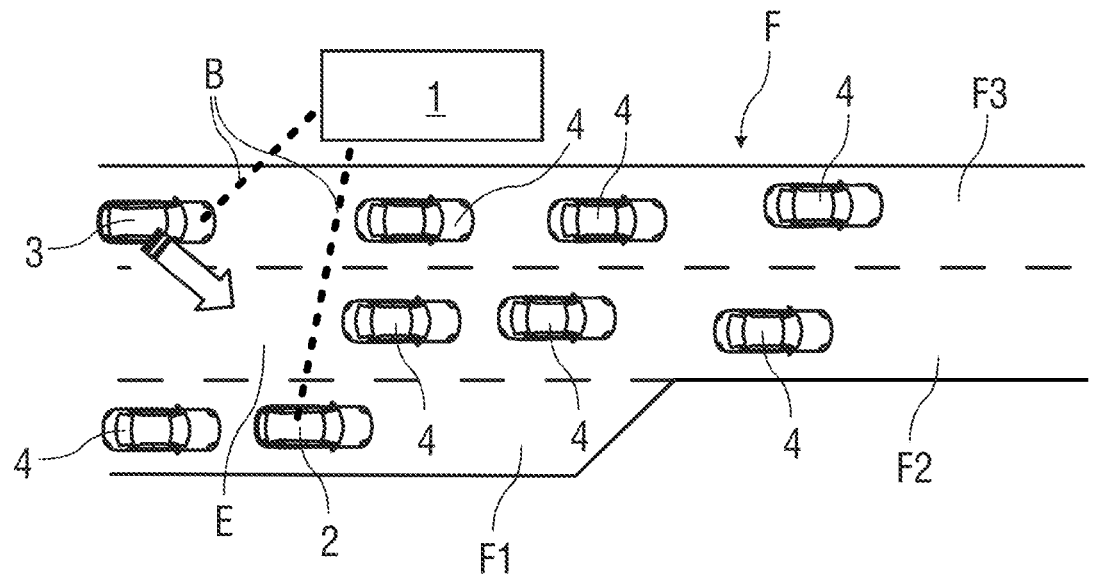
Figure 4:
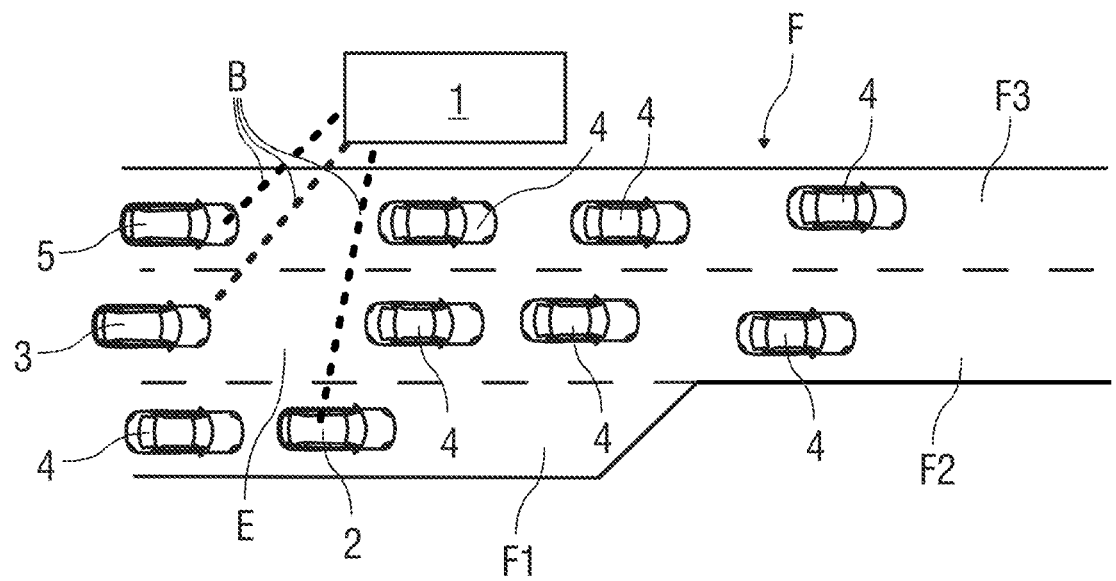

Here:

FIG. 1 shows, schematically, a roadway section having several traffic lanes and an acceleration lane having a number of vehicles, and a central computer unit, FIG. 2 shows, schematically, the roadway section and two vehicles communicating via the central computer unit in a first traffic situation, FIG. 3 shows, schematically, the roadway section and two vehicles communicating via the central computer unit in a second traffic situation, FIG. 4 shows, schematically, the roadway section and three vehicles communicating via the central computer.

Parts corresponding to one another are labelled in all figures with the same reference numerals.

DETAILED DESCRIPTION

FIG. 1 shows a roadway section F, having an acceleration lane F1, a traffic lane F2 and an overtaking lane F3, wherein a central computer unit 1 is also depicted.

A vehicle 2 driving in the acceleration lane F1 is moved in the automated driving mode, wherein a further vehicle 3, which is also automated, is located in the traffic lane F2, to the side of and behind the vehicle 2. All other road users are manually operated vehicles 4.

A development of automatically driving vehicles 2, 3 in the road traffic represents a comparatively large research field of the automobile industry. Driving behavior of automated vehicles 2, 3 can be significantly different from manually operated vehicles 4 in terms of their behavior. This can lead both to advantages and to disadvantages in so-called mixed traffic.

As the driving behavior of manually operated vehicles 4 is relatively difficult to predict, and the manually operated vehicles 4 can often have unexpected driving behavior resulting from the actions of a respective vehicle user, mixed traffic can represent a comparatively significant challenge for an automated vehicle 2, 3.

For example, a merging of the automated vehicle 2 from the acceleration lane F1 to the traffic lane F2 is relatively hard, as the manually operated vehicles 4 can pose a problem for the vehicle 2 resulting from their driving behavior, which is difficult to predict.

The time gaps used by manually operated vehicles 4 to merge into a traffic lane F2 are comparatively short for vehicles 2, 3 driving in the automated driving mode, such that they do not use time gaps of this kind, and so run the risk of committing an offence, as a flow of traffic is impeded.

The term time gap is understood as a length of time within which two vehicles 2 to 4, driving one behind the other, pass a specific point.

To enable the merging of the automated vehicle 2 into the traffic lane F2 in mixed traffic, especially within a predetermined time gap, a method described in the following is provided, which supports a cooperative merging maneuver of the vehicle 2.

The automated vehicles 2, 3, as shown in FIG. 2, are connected via a radio link B to the central computer unit 1, the radio link being represented by a dotted line. Here, the automated vehicles 2, 3 connect to the central computer unit 1 to send information to or receive information from the central computer unit 1.

Here, the central computer unit 1 is located in a local environment of the vehicles 2, 3 supported by means of the computer unit 1. Because of a local proximity between the central computer unit 1 and the automated vehicles 2, 3, the duration required for the sending and receiving is comparatively short, e.g., shorter than 1 second.

As described above, two automated vehicles 2, 3 and a plurality of manually operated vehicles 4 are driving on the roadway section F, wherein the automated vehicle 2 is located in the acceleration lane F1 of the roadway section F.

When the vehicle 2 approaches the acceleration lane F1, but at the latest when the vehicle 2 drives into the acceleration lane F1, the vehicle 2 sends its intended merging maneuver to the central computer unit 1.

By means of the central computer unit 1, according to the present exemplary embodiment in FIG. 2, information about the intended merging maneuver of the vehicle 2 into the traffic lane F2 is transmitted to the automated further vehicle 3.

The further vehicle 3 transmits a confirmation of receipt of the intended merging maneuver to the vehicle 2 via the central computer unit 1, whereby the further vehicle 3 signals its cooperation in relation to the merging maneuver of the vehicle 2.

The further vehicle 3 reduces its driving speed to increase a distance between itself and a manually operated vehicle 4 driving ahead, whereby the further vehicle 3 forms a merging gap E in the traffic lane F2 for the vehicle 2.

Alternatively, or additionally, if the automated further vehicle 3 is driving in the overtaking lane F3 during the receipt of the information about the intended merging maneuver of the vehicle 2, as shown in FIG. 3, it carries out a lane change to the traffic lane F2. In this way, the merging gap E for the vehicle 2 is formed, in particular also by reducing the driving speed of the further vehicle 3, wherein the further vehicle 3 therefore serves as a placeholder for the vehicle 2.

If, as shown in FIG. 4, two automated further vehicles 3, 5 are located in an environment of the vehicle 2 in the acceleration lane F1, in particular to the side of and behind the vehicle, then the two further vehicles 3, 5 can behave cooperatively towards the vehicle 2 that is intending to merge.

According to the exemplary embodiment in FIG. 4, the further vehicle 3 is driving in the traffic lane F2, and another further vehicle 5 is driving in the overtaking lane, to the side of and behind the further vehicle 3.

In particular, the merging gap E for the vehicle 2 in the traffic lane F2 is formed by means of the further vehicle 23, wherein it is largely prevented by means of the other further vehicle 5 that a road user, in particular a manually operated vehicle 4, switches from the overtaking lane F3 into the merging gap E.

By means of the two further vehicles 2, 3, 5 cooperative merging is enabled for the vehicle 2 via the central computer unit 1, wherein the cooperative merging can ensure an increase in safety in comparison with human driving behavior.

If more than two automated vehicles 2, 5 are driving in the traffic lane F2 and/or the overtaking lane F3, then the further vehicle 3, 5 that is located nearest to the vehicle 2 is classified as suitable for forming the merging gap E for the vehicle 2 by means of the central computer unit 1. For this purpose, a respective current position of the further vehicles 3, 5 relative to the acceleration lane F1, and in particular relative to the vehicle 2, is determined. In particular, the information about the intended merging maneuver is transmitted to the further vehicle 3, 5 that has been classified as suitable for forming the merging gap E. Alternatively, the further vehicle 3, 5 located the closest to the vehicle 2 sends the confirmation to cooperate with the vehicle 2 in relation to its intended merging maneuver.

In particular, the automated further vehicle 3 drives in the traffic lane F2 and adapts its speed in such a way that the further vehicle 3 is driving in a comparatively close environment to the acceleration lane F1 and the vehicle 2.

If the further vehicle 3 ascertains, by adapting its driving behavior, in particular by reducing its driving speed, that a distance between the vehicle 3 and a manually operated vehicle 4 driving ahead is large enough that the vehicle 2 can merge from the acceleration lane F1 into the traffic lane F2, and additionally in the overtaking lane F3, e.g., no manually operated vehicle 4 that could move into the merging gap E is driving, then the further vehicle 3 reports to the central computer unit 1 that the vehicle 2 can drive from the acceleration lane F1 into the merging gap E in the traffic lane F2.

Consequently, the vehicle 2 confirms the merging maneuver via the central computer unit 1 and carries out a corresponding lane change.

An automated vehicle 3, 5 located on the roadway section F has the option to refuse a request of the vehicle 2 for desired cooperation, to switch from the acceleration lane F1 to the traffic lane F2. Here, the refusal is carried out by a person who is located in the further vehicle 3, 5, or by a corresponding default setting that refuses cooperation with an automated vehicle 2.

In one embodiment, it is provided that two or several automated further vehicles 3, 5 cooperate with the vehicle 2 driving in the acceleration lane F1 via the central computer unit 1, wherein two of the further vehicles 3, 5 adapt their driving speed in such a way that a merging gap E is formed between these two further vehicles 3, 5 in the traffic lane F2, into which the vehicle 2 merges.

In relation to FIG. 4, the two further vehicles 3, 5 drive next to each other in the automated driving mode in such a way that it can largely be avoided that a manually operated vehicle 4 can drive past the two further vehicles 3, 5. In this way, the vehicle 2 in the acceleration lane F1 can work on the presumption that no manually operated vehicle 4, whose driving behavior is unpredictable and can therefore represent a danger for the vehicle 2 during the merging maneuver, will approach it.

The cooperation occurring via the central computer unit 1 is not only possible between the automated vehicle 2 and the automated further vehicles 3, 5, such that manually operated vehicles 4 can also be deployed as cooperation partners for an intended merging maneuver. The condition for this is that the manually operated vehicles 4 have a radio connection B to the central computer unit 1, in order to carry out a communication between the vehicle 2 and the corresponding manually operated vehicles 4.

In a possible embodiment of the method, the merging gap E can also be formed for the vehicle 2 behind the further vehicle 3 in the traffic lane F2, wherein the danger here arises that, for example, a manually operated vehicle 4 uses this merging gap E for itself to drive from the overtaking lane F3 into the traffic lane F2, or that a following manually operated vehicle 4 reduces the distance to the further vehicle 3.

Additionally, safety can also be increased during merging into the traffic lane F2 by means of the method, when exclusively manually operated vehicles 4 are located in the traffic lane F2, which do not cooperate with the vehicle 2 via the central computer unit 1.

In an alternative or additional embodiment, for increasing safety on the roadway section F, recording units can be located in the traffic lane F2 in the region in front of and behind the acceleration lane F1, in particular induction loops and/or infrastructure sensors. If no further road users are registered by the recording units, then it can be shared with the vehicle 2 via the central computer unit 1 that the intended merging maneuver into the traffic lane F2 can be carried out.

The method is additionally suitable for carrying out an overtaking maneuver, wherein a merging gap E can be provided for the vehicle 2 by means of further vehicles 3,5 and/or by means of manually operated vehicles 4, for carrying out the overtaking maneuver and for ending the overtaking maneuver.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method comprising:
transmitting, by a vehicle to a central computer via a radio link, a merging maneuver intended by the vehicle to merge from an acceleration lane into a traffic lane of a multi-lane roadway section, wherein the vehicle is driven in an automated driving mode, and wherein the multi-lane roadway section further includes an overtaking lane;
transmitting, from the central computer to at least two further vehicles located in the overtaking lane on the multi-lane roadway section in an environment of the vehicle, information about the intended merging maneuver of the vehicle;
preparing by a first one of the at least two further vehicles, responsive to the transmission by the central computer of the information about the intended merging maneuver of the vehicle, a merging gap by the first one of the at least two further vehicles performing a lane change from the overtaking lane to the traffic lane; and
preventing, by a second one of the at least two further vehicles located in the overtaking lane, a lane change of road users from the overtaking lane into the merging gap in the traffic lane.

2. The method of claim 1, wherein the at least two further vehicles are driven in the automated driving mode.

3. The method of claim 1, further comprising:
sending, by the at least two further vehicles via the central computer to the vehicle, a confirmation of receipt of the intended merging maneuver.

4. The method of claim 1, wherein the first one of the at least two further vehicles reduces a current speed of the first one of the at least two further vehicles to form the merging gap.

5. The method of claim 1, wherein the merging gap is formed accounting for the road users in the environment of the at least two further vehicles.

6. The method of claim 1, wherein the information about the intended merging maneuver of the vehicle is transmitted, by the central computer, to a third further vehicle classified, due to a current position of the third further vehicle, by the central computer as suitable for forming the merging gap.

* * * * *